United States Patent
Godard et al.

(10) Patent No.: US 9,690,581 B2
(45) Date of Patent: Jun. 27, 2017

(54) COMPUTER PROCESSOR WITH DEFERRED OPERATIONS

(71) Applicant: Mill Computing, Inc., Palo Alto, CA (US)

(72) Inventors: Roger Rawson Godard, East Palo Alto, CA (US); Arthur David Kahlich, Sunnyvale, CA (US); Nachum Kanovsky, Sunnyvale, CA (US); David Arthur Yost, Los Altos, CA (US); Sebastien Paul Maurice Mirolo, San Francisco, CA (US)

(73) Assignee: Mil Computing, Inc., Palo Alto, CA (US)

( * ) Notice: Subject to any disclaimer, the term of this patent is extended or adjusted under 35 U.S.C. 154(b) by 281 days.

(21) Appl. No.: 14/515,033

(22) Filed: Oct. 15, 2014

(65) Prior Publication Data
US 2015/0106597 A1    Apr. 16, 2015

Related U.S. Application Data

(60) Provisional application No. 61/890,891, filed on Oct. 15, 2013.

(51) Int. Cl.
*G06F 9/30* (2006.01)
*G06F 9/40* (2006.01)
(Continued)

(52) U.S. Cl.
CPC ...... *G06F 9/30032* (2013.01); *G06F 9/30145* (2013.01); *G06F 12/0292* (2013.01); *G06F 12/0811* (2013.01); *G06F 12/0864* (2013.01); *G06F 12/0893* (2013.01); *G06F 12/1027* (2013.01); *G06F 12/0897* (2013.01); *G06F 12/1009* (2013.01); *G06F 17/30286* (2013.01);
(Continued)

(58) Field of Classification Search
None
See application file for complete search history.

(56) References Cited

U.S. PATENT DOCUMENTS 5,125,083 A * 6/1992 Fite .................. G06F 9/3816
                                              712/207
5,889,947 A * 3/1999 Starke ............... G06F 9/30087
                                              700/5

(Continued)

OTHER PUBLICATIONS

U.S. Appl. No. 14/311,988, filed Jun. 23, 2014, Roger Rawson Godard et al.

*Primary Examiner* — Michael Sun
(74) *Attorney, Agent, or Firm* — Gordon & Jacobson, P.C.

(57) ABSTRACT

A computer processor and corresponding method of operation employs execution logic that includes at least one functional unit and operand storage that stores data that is produced and consumed by the at least one functional unit. The at least one functional unit is configured to execute a deferred operation whose execution produces result data. The execution logic further includes a retire station that is configured to store and retire the result data of the deferred operation in order to store such result data in the operand storage, wherein the retire of such result data occurs at a machine cycle following issue of the deferred operation as controlled by statically-assigned parameter data included in the encoding of the deferred operation.

23 Claims, 8 Drawing Sheets

(51) Int. Cl.
*G06F 12/0893* (2016.01)
*G06F 12/0811* (2016.01)
*G06F 12/0864* (2016.01)
*G06F 12/02* (2006.01)
*G06F 12/1027* (2016.01)
G06F 12/1009 (2016.01)
G06F 17/30 (2006.01)
G06F 12/0897 (2016.01)

(52) U.S. Cl.
CPC ............... *G06F 2212/1024* (2013.01); *G06F 2212/1028* (2013.01); *G06F 2212/283* (2013.01); *G06F 2212/608* (2013.01); *G06F 2212/6032* (2013.04); *G06F 2212/684* (2013.01); *Y02B 60/1225* (2013.01)

(56) References Cited

U.S. PATENT DOCUMENTS

| | | | | |
|---|---|---|---|---|
| 5,919,256 A | * | 7/1999 | Widigen | G06F 9/383 711/100 |
| 5,974,538 A | * | 10/1999 | Wilmot, II | G06F 9/30069 712/217 |
| 2004/0128484 A1 | | 7/2004 | Sperber et al. | |
| 2006/0101249 A1 | * | 5/2006 | Bacon | G06F 8/314 712/226 |
| 2006/0212682 A1 | | 9/2006 | Baxter et al. | |
| 2009/0164729 A1 | | 6/2009 | Robinson | |
| 2011/0154079 A1 | | 6/2011 | Dixon et al. | |
| 2012/0089819 A1 | * | 4/2012 | Chaudhry | G06F 9/3838 712/214 |

* cited by examiner

Fetch ⟶ Decode ⟶ Issue ⟶ Execute ⟶ Retire

COMPUTER PROCESSOR WITH DEFERRED OPERATIONS

CROSS-REFERENCE TO RELATED APPLICATIONS

The present disclosure claims priority from U.S. Provisional Patent Appl. No. 61/890,891, filed on Oct. 15, 2013, entitled "Cache Support for a Computer Processor," herein incorporated by reference in its entirety.

BACKGROUND

1. Field

The present disclosure relates to computer processors (also commonly referred to as CPUs).

2. State of the Art

A computer processor (and the program which it executes) needs places to put data for later reference. A computer processor design will typically have many such places, each with its own trade off of capacity, speed of access, and cost. Usually these are arranged in a hierarchal manner referred to as the memory system of the processor, with small, fast, costly places used for short lived small data and large, slow and cheap places used for what doesn't fit in the small, fast, costly places. The memory system typically includes the following components arranged in order of decreasing speed of access:

- register file or other form of fast operand storage;
- one or more levels of cache memory (one or more levels of the cache memory can be integrated with the processor (on-chip cache) or separate from the processor (off-chip cache);
- main memory (or physical memory), which is typically implemented by DRAM memory and/or NVRAM memory and/or ROM memory;
- controller card memory; and
- on-line mass storage (typically implemented by one or more hard disk drives).

In many computer processors, the main memory of the memory system can take several hundred machine cycles to access. The cache memory, which is much smaller and more expensive but with faster access as compared to the main memory, is used to keep copies of data that resides in the main memory. If a reference finds the desired data in the cache (a cache hit) it can access it in a few machine cycles instead of several hundred when it doesn't (a cache miss). Because a program typically has nothing else to do while waiting to access data in memory, using a cache and making sure that desired data is copied into the cache can provide significant improvements in performance.

In computer processors operations have an inherent hardware-determined time required for their execution, which is referred to as execution latency. For most operations (such as Add operation), the execution latency is fixed in terms of machine cycles. For some operations, the execution latency may vary from execution to execution depending on details of the argument operands or the state of the machine.

The issue cycle of an operation (the machine cycle when the operation begins execution) precedes the retire cycle (the machine cycle when the execution of the operation has completed and its results are available, and/or any machine consequences must become visible). In the retire cycle, the results can be written back to operand storage (e.g., register file) or otherwise made available to functional units of the processor. The number of machine cycles between the desired issue and retire cycles is the schedule latency of the operation. Note that schedule latency is in terms of the order of execution desired by the program, whether or not the desired schedule can be actually achieved by a particular operation execution. That is, the execution latency may not equal the schedule latency.

For operations of fixed execution latency, it is convenient to simply define the schedule latency to be equal to the execution latency. If such an operation is placed in an instruction issued in some machine cycle, then the results of the operation will be available naturally during the retire cycle, a number of machine cycles later corresponding to the execution latency of the operation, and consumers of those results can then be issued. This scheduling strategy is called static scheduling with exposed pipeline, and is common in stream and signal processors.

It can be difficult to statically schedule operations whose execution latency varies from execution to execution. Commonly such operations have a known minimum execution latency if all goes well, but if certain run-time events occur then the operation is delayed and cannot complete until later. Thus a load operation may complete three machine cycles after issue if the desired data are found in the top level cache, but may take hundreds of machine cycles if the data must be fetched from DRAM memory. This problem is known as a load stall, and such load stalls were the major driver for the development of out-of-order superscalar architectures. Such superscalars issue loads as soon as the address is known, as far in advance of the code that will use the loaded value as possible; the read then takes as long as it takes. While waiting for the data, a superscalar machine schedules and executes a dynamic number of other operations that are ready to execute and don't depend on the awaited value. Such a machine doesn't have a fixed number of delay slots, but has in essence a run time determined variable number of slots, as many as are needed for the data to load. Thus, a superscalar machine does not stall unless it completely runs out of operations that don't depend on the loaded value. A superscalar can have hundreds of operations in flight waiting to complete, and many operations that are waiting for their data. The cost is extreme complexity and a chip that is spendthrift in power and area.

Computer processors that employ static scheduling with an exposed pipeline are much simpler and much more economical of power and area than superscalar architectures. However, any actual stalls are much more painful, because there may be operations that are ready to execute (and that a superscalar would execute) but cannot be issued because the lock-step nature of an in-order machine is waiting for an irrelevant load to complete. Because of this difficulty, static scheduling has come to be used only for embedded applications in which the variability of memory reference latencies is bounded and small. General-purpose applications, where the variability is large, have come to use dynamically scheduled architectures which mask the variability by executing operations out of program order as soon as their arguments become available.

SUMMARY OF THE INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

Illustrative embodiments of the present disclosure are directed to a computer processor having execution logic that includes at least one functional unit and operand storage that stores data that is produced and consumed by the at least one functional unit. The at least one functional unit is configured to execute a deferred operation whose execution produces result data. The execution logic further includes a retire station that is configured to store and retire the result data of the deferred operation in order to store such result data in the operand storage, wherein the retire of such result data occurs at a machine cycle following issue of the deferred operation as controlled by statically-assigned parameter data included in the encoding of the deferred operation.

The statically-assigned parameter data can define a schedule latency for the deferred operation and the execution of the deferred operation can define an execution latency. In the event that the execution latency expires before the schedule latency, the retire station can be configured to buffer the result data for at least one machine cycle following the expiration of the execution latency. In the event that the schedule latency expires before the execution latency, the retire station can be configured to control the execution logic to stall for at least one machine cycle following the expiration of the schedule latency. In the event that a call operation occurs within the schedule latency of the deferred operation, the schedule latency can be defined to include a time period executed within the callee of the call operation or can be defined to exclude a time period executed within the callee of the call operation. The execution logic can be configured to discard any result data stored by the retire station in conjunction with processing the call operation. The execution logic further can further include logic that saves data pertaining to the deferred operation and uses the saved data to reissue the deferred operation in response to returning from the callee of the call operation.

In one embodiment, the statically-assigned parameter data can represent a number of machine cycles between issuing of the deferred operation and retiring the result data produced by execution of the deferred operation under the assumption that such result data is available at the time of retiring. The statically-assigned parameter data can be used to configure a count-down timer whose output is used to dictate the machine cycle in which the result data produced by execution of the deferred operation is retired.

In another embodiment, the statically-assigned parameter data can represent an operational identifier that is used by a corresponding pickup operation whose execution dictates the machine cycle in which the result data produced by execution of the deferred operation is retired.

In one embodiment, the deferred operation can comprise a deferred load operation that is executed by a load unit. A retire station can allocated from a pool of retire stations such that the allocated retire station stores result data produced by the execution of the deferred load operation. The execution of the deferred load operation by the load unit can involve generating a load request for communication to a hierarchical memory system. The retire station can be configured to monitor intervening store requests communicated to the hierarchical memory system in order to determine if the address data of such intervening store requests overlap with the address of the deferred load operation handled by the retire station, and if so stores the data of the store request for retirement to the operand storage of the execution logic.

A method of operating a computer processor is also provided that includes configuring at least one functional unit to execute a deferred operation whose execution produces result data, and configuring a retire station to store and retire the result data of the deferred operation in order to store such result data in operand storage of the computer processor, wherein the retire of such result data occurs at a machine cycle following issue of the deferred operation as controlled by statically-assigned parameter data included in the encoding of the deferred operation.

The statically-assigned parameter data of the method can define schedule latency for the deferred operation and the execution of the deferred operation defines an execution latency. In the event that the execution latency expires before the schedule latency, the method can further include configuring the retire station to buffer the result data for at least one machine cycle following the expiration of the execution latency. In the event that the schedule latency expires before the execution latency, the method can further include configuring the retire station to control the execution logic to stall for at least one machine cycle following the expiration of the schedule latency.

In one embodiment, the statically-assigned parameter data of the method can represent a number of machine cycles between issue of the deferred operation and retiring the result data produced by execution of the deferred operation under the assumption that such result data is available at the time of retiring. The method can further include using the statically-assigned parameter data to configure a count-down timer whose output is used to dictate the machine cycle in which the result data produced by execution of the deferred operation is retired.

In another embodiment, the statically-assigned parameter data of the method can represent an operational identifier that is used by a corresponding pickup operation whose execution dictates the machine cycle in which the result data produced by execution of the deferred operation is retired.

In another aspect, a computer processor is provided that includes execution logic and at least one cache memory integrated as part of an integrated circuit. The execution logic includes at least one functional unit and operand storage that stores data that is produced and consumed by the at least one functional unit. The at least one functional unit includes a load unit configured to execute a deferred load operation whose execution communicates with the least one cache memory to retrieve result data therefrom. The execution logic further includes a retire station that is configured to store and retire the result data of the deferred load operation in order to store such result data in the operand storage, wherein the retire of such result data occurs at a machine cycle following issue of the deferred load operation as controlled by statically-assigned parameter data included in the encoding of the deferred load operation.

DETAILED DESCRIPTION OF THE PREFERRED EMBODIMENTS

Figures 1, 2:
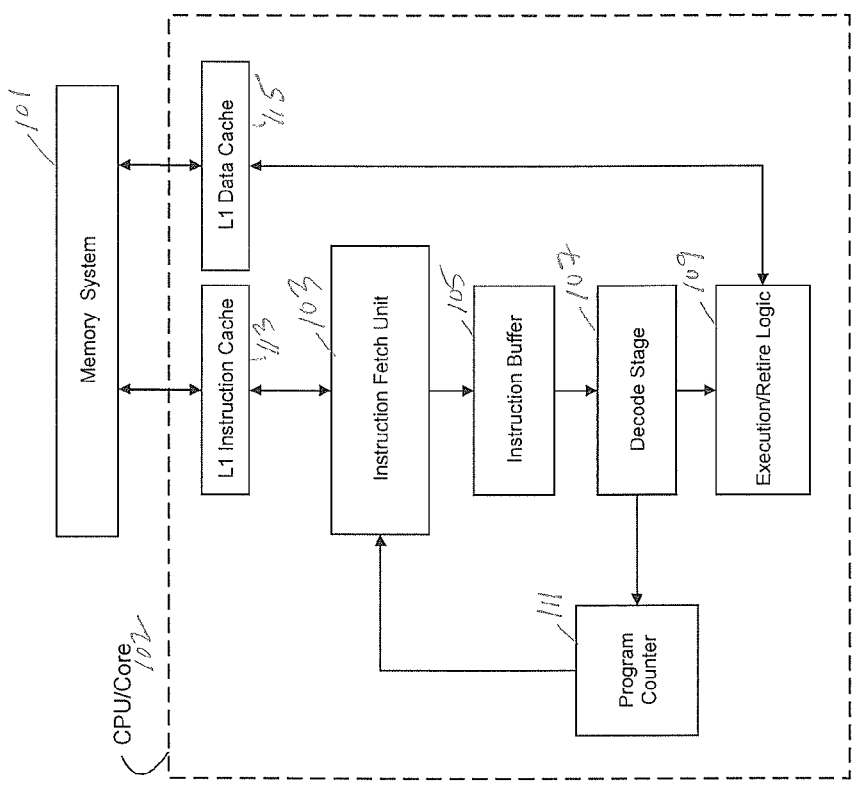
FIG. 1 is a schematic block diagram of a computer processing system according to an embodiment of the present disclosure.
FIG. 2 is a schematic diagram of exemplary pipeline of processing stages that can be embodiment by the computer processor of FIG. 1.

Illustrative embodiments of the disclosed subject matter of the application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

As used herein, the term "operation" is a unit of execution, such as an individual add, load, store or branch operation.

The term "instruction" is a unit of logical encoding including zero or more operations. For the case where an instruction includes multiple operations, the multiple operations are semantically performed together.

The term "hierarchical memory system" is a computer memory system storing instructions and operand data for access by a processor in executing a program where the memory is organized in a hierarchical arrangement of levels of memory with increasing access latency from the top level of memory closest to the processor to the bottom level of memory furthest away from the processor.

The term "cache line" or "cache block" is a unit of memory that is accessed by a computer processor. The cache line includes a number of bytes (typically 4 to 128 bytes).

The computer processor of the present application employs statically scheduled operations that execute with much of the tolerance for latency variability as compared to out-of-order architecture, while retaining the power, area and complexity advantages of a statically-scheduled architecture. It is applicable to any variable-latency operation, of which the Deferred Load or DLOAD operation as described below is an example.

Specifically, the instruction set architecture of the computer processor can be augmented so as to permit the computer processor to distinguish the issue step of the operation from the retire step of the same operation, where the distinction is under program control. The issue step of the operation is handled by normal encoding, as the operation would be encoded absent the invention. However, means is also provided to separately control the occurrence and timing of the retire step of the operation. The consequence is that the schedule latency of the operation is under explicit program control. The issue and retire steps can be temporally separated as much as possible to achieve the greatest possible masking of the variability of the execution latency. An operation in which the issue and retire steps have been separated in time in this manner is herein called a "deferred operation."

In the event that the execution latency of the deferred operation is less than the controlled schedule latency, then the value of the result of the operation is retained in a buffer provided for this purpose until the scheduled latency expires, whereupon the contents of the buffer are provided to the execution exactly as if the execution and schedule latencies had been the same.

Alternatively, in the event the execution latency exceeds the controlled schedule latency, then the execution of the rest of the program is delayed (or stalls) until the execution latency expires and the value of the result becomes available, whereupon the result of the operation is provided to the execution, and execution is permitted to resume exactly as if the execution and schedule latencies had been the same.

One method of controlling the schedule latency, applicable in circumstances for which is it possible to statically know the number of machine cycles between the desired point of issue of an operation and the desired point of retire of the operation, is to encode cycle count data in the machine code of the deferred operation. The cycle count data explicitly represents the desired schedule latency in zero or more machine cycles. The count is counted down with each machine cycle, and the schedule latency expires when the count reaches zero. If the execution latency of the deferred operation has not expired at the time that the schedule latency expires, then the machine stalls until the execution latency expires and the result of the deferred operation is available. At this point, the result of the deferred operation is retired. If the execution latency has already expired before the schedule latency expires, then the result is buffered until the expiration of the schedule latency when the count reaches zero. At this point, the result of the deferred operation is retired.

Another method of controlling the schedule latency, applicable in circumstance for which it is impossible to statically know the number of machine cycles between the desired points of issue and retire of the operation, is to encode a statically assigned operation identifier in the machine code of the deferred operation. At some subsequent point, the machine code includes a separate "pickup" operation carrying the same operation identifier, which defines the retire point of the original operation. The execution of the pickup instruction controls the schedule latency of the deferred operation. As before, if the execution latency of the deferred operation has not expired at the point of pickup operation, then the machine stalls until the execution latency expires and the result of the deferred operation is available. At this point, the result of the deferred operation is retired. If the execution latency has already expired before the execution of the pickup operation, then the result is buffered until execution of the pickup operation. At this point, the result of the deferred operation is retired.

In one embodiment, in the event that the machine stalls waiting for the expiration of the execution latency, both the issuance and retire stages of execution can stall with only truly asynchronous activity, such as in-flight loads and stores, continuing.

Various error conditions may be recognized, such as pickup operation without previous issue of the same identifier, or issue reuse of an identifier without intervening pickup. These errors may be ignored, or may be reported to the program according to the architecture's chosen fault policy. The architecture may also define a separate "refuse" operation that discards a pending pickup operation that the program no longer needs, so that the identifier may be reused. With "refuse", deferred pickup operations may be issued speculatively in advance of possible need. The architecture may elect to distinguish speculative pickup operations from non-speculative, and alter the behavior of the operation execution based on the distinction. For example, for deferred pickup loads the architecture may honor page traps immediately as they occur on non-speculative loads, but defer them until pickup for speculative loads so as to avoid paging on loads that in fact are never needed.

Other methods of controlling the schedule latency will be evidently applicable, depending on the details of the rest of the computer processor.

In general, the semantics of a program using deferred operations will depend on the architecture-defined semantics of the interactions between the deferred operations and other concurrent operations. Using the example of the DLOAD operation, and considering when a program contains several loads and stores to the same or overlapping addresses, the result of the program depends upon the order of execution of those accesses, which order must therefore be defined. The execution order definition varies among different machine architectures, ranging from strict program order to an order defined by extra barrier instructions. Many machines speculatively execute load and store operations in an order that conflicts with the defined order, but use hardware devices such as snooping to make the program appear to have executed in the defined order. Thus the defined order is in terms of program-observable consequences, and not necessarily physical execution.

In the presence of the program-controlled latency, it is possible for the schedule latencies of two operations to wholly or partially overlap. Hence it is necessary to define the execution order in terms of the entire schedule latency. As a practical matter, only two possible definitions offer both ease of implementation and semantic utility: the ordering may be in terms of the respective issue cycles of the operations, or of their retire cycles. For a given program, these orders (and the resulting program semantics) may differ whenever loads and stores overlap in address and in schedule latency, and similarly for other possible deferred operations that may overlap with operations with which they have a semantic dependency. Either of these definitions may be advantageous in a given architecture, depending on the rest of the design. The defined order can be ensured by applying well known methods for order control used in out-of-order machines, including compiler alias analysis and hardware address snooping, among others.

In accordance with the present disclosure, a sequence of instructions is stored in the memory system 101 and processed by a CPU (or Core) 102 as shown in the exemplary embodiment of FIG. 1. The CPU (or Core) 102 includes a number of instruction processing stages including at least one instruction fetch unit (one shown as 103), at least one instruction buffer or queue (one shown as 105), at least one decode stage (one shown as 107) and execution/retire logic 109 that are arranged in a pipeline manner as shown. The CPU (or Core) 102 also includes at least one program counter (one shown as 111), at least one L1 instruction cache (one shown as 113), and an L1 data cache 115.

The L1 instruction cache 113 and the L1 data cache 115 are logically part of the hierarchy of the memory system 101. The L1 instruction cache 113 is a cache memory that stores copies of instruction portions stored in the memory system 101 in order to reduce the latency (i.e., the average time) for accessing the instruction portions stored in the memory system 101. In order to reduce such latency, the L1 instruction cache 113 can take advantage of two types of memory localities, including temporal locality (meaning that the same instruction will often be accessed again soon) and spatial locality (meaning that the next memory access for instructions is often very close to the last memory access or recent memory accesses for instructions). The L1 instruction cache 113 can be organized as a set-associative cache structure, a fully associative cache structure, or a direct mapped cache structure as is well known in the art. Similarly, the L1 data cache 115 is a cache memory that stores copies of operands stored in the memory system 101 in order to reduce the latency (i.e., the average time) for accessing the operands stored in the memory system 101. In order to reduce such latency, the L1 data cache 115 can take advantage of two types of memory localities, including temporal locality (meaning that the same operand will often be accessed again soon) and spatial locality (meaning that the next memory access for operands is often very close to the last memory access or recent memory accesses for operands). The L1 data cache 115 can be organized as a set-associative cache structure, a fully associative cache structure, or a direct mapped cache structure as is well known in the art. The hierarchy of the memory system 201 can also include additional levels of cache memory, such as a level 2 and level 3 caches, as well as system memory. One or more of these additional levels of the cache memory can be integrated with the CPU 202 as is well known. The details of the organization of the memory hierarchy are not particularly relevant to the present disclosure and thus are omitted from the figures of the present disclosure for sake of simplicity.

The program counter 111 stores the memory address for a particular instruction and thus indicates where the instruction processing stages are in processing the sequence of instructions. The memory address stored in the program counter 111 can be used to control the fetching of the instructions by the instruction fetch unit 103. Specifically, the program counter 111 can store the memory address for the instruction to fetch. This memory address can be derived from a predicted (or resolved) target address of a control-flow operation (branch or CALL operation), the saved address in the case of a RETURN operation, or the sum of memory address of the previous instruction and the length of previous instruction. The memory address stored in the program counter 111 can be logically partitioned into a number of high-order bits representing a cache line address ($ Cache Line) and a number of low-order bits representing a byte offset within the cache line for the instruction.

The instruction fetch unit 103, when activated, sends a request to the L1 instruction cache 113 to fetch a cache line from the L1 instruction cache 113 at a specified cache line address ($ Cache Line). This cache line address can be derived from the high-order bits of the program counter 111. The L1 instruction cache 113 services this request (possibly accessing higher levels of the memory system 101 if missed in the L1 instruction cache 113), and supplies the requested cache line to the instruction fetch unit 103. The instruction fetch unit 103 passes the cache line returned from the L1 instruction cache 113 to the instruction buffer 105 for storage therein.

The decode stage 107 is configured to decode one or more instructions stored in the instruction buffer 105. Such decoding generally involves parsing and decoding the bits of the instruction to determine the type of operation(s) encoded by the instruction and generate control signals required for execution of the operation(s) encoded by the instruction by the execution/retire logic 109.

The execution/retire logic 109 utilizes the results of the decode stage 107 to execute the operation(s) encoded by the instructions. The execution/retire logic 109 can send a load request to the L1 data cache 115 to fetch data from the L1 data cache 115 at a specified memory address. The L1 data cache 115 services this load request (possibly accessing higher levels of the memory system 101 if missed in the L1 data cache 115), and supplies the requested data to the execution/retire logic 109. The execution/retire logic 109 can also send a store request to the L1 data cache 115 to store data into the memory system at a specified address. The L1 data cache 115 services this store request by storing such data at the specified address (which possibly involves overwriting data stored by the data cache).

The instruction processing stages of the CPU (or Core) 102 can achieve high performance by processing each instruction and its associated operation(s) as a sequence of stages each being executable in parallel with the other stages. Such a technique is called "pipelining." An instruction and its associated operation(s) can be processed in five stages, namely, fetch, decode, issue, execute and retire as shown in FIG. 2.

In the fetch stage, the instruction fetch unit 103 sends a request to the L1 instruction cache 113 to fetch a cache line from the L1 instruction cache 113 at a specified cache line address ($ Cache Line). The instruction fetch unit 103 passes the cache line returned from the L1 instruction cache 113 to the instruction buffer 105 for storage therein.

The decode stage 107 decodes one or more instructions stored in the instruction buffer 107. Such decoding generally involves parsing and decoding the bits of the instruction to determine the type of operation(s) encoded by the instruction and generating control signals required for execution of the operation(s) encoded by the instruction by the execution/retire logic 109.

In the issue stage, one or more operations as decoded by the decode stage are issued to the execution logic 109 and begin execution.

In the execute stage, issued operations are executed by the functional units of the execution/retire logic 109 of the CPU/Core 102.

In the retire stage, the results of one or more operations produced by the execution/retire logic 109 are stored by the CPU/Core 102 as transient result operands for use by one or more other operations in subsequent issue/execute cycles.

The execution/retire logic 109 includes a number of functional units (FUs) which perform primitive steps such as adding two numbers, moving data from the CPU proper to and from locations outside the CPU such as the memory hierarchy, and holding operands for later use, all as are well known in the art. Also within the execution/retire logic 109 is a connection fabric or interconnect network connected to the FUs so that data produced by a producer (source) FU can be passed to a consumer (sink) FU for further storage or operations. The FUs and the interconnect network of the execution/retire logic 109 are controlled by the executing program to accomplish the program aims.

During the execution of an operation by the execution logic 109 in the execution stage, the functional units can access and/or consume transient operands that have been stored by the retire stage of the CPU/Core 102. Note that some operations take longer to finish execution than others. The duration of execution, in machine cycles, is the execution latency of an operation. Thus, the retire stage of an operation can be latency cycles after the issue stage of the operation. Note that operations that have issued but not yet completed execution and retired are "in-flight." Occasionally, the CPU/Core 102 can stall for a few machine cycles. Nothing issues or retires during a stall and in-flight operations remain in-flight.

Figure 3:
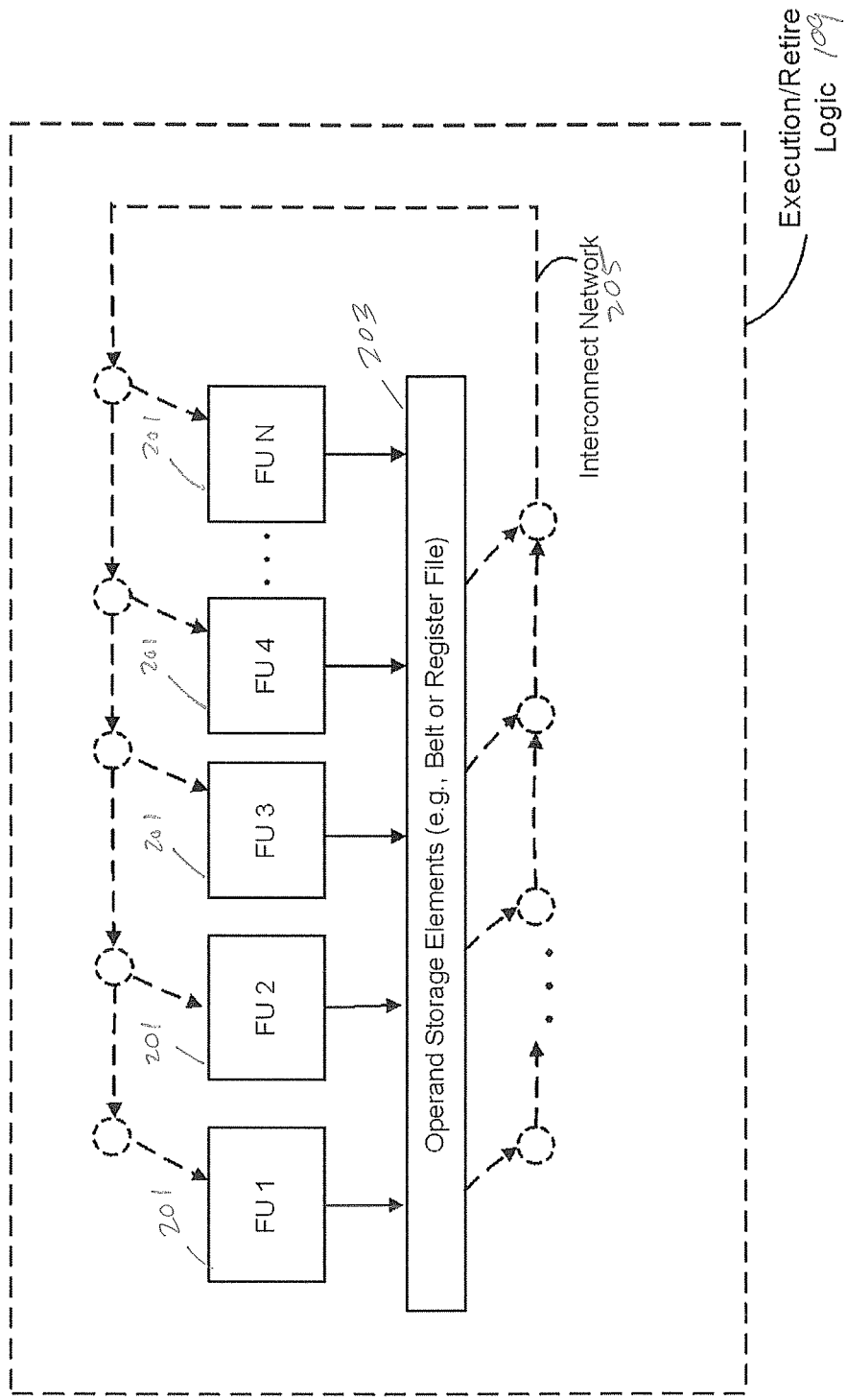
FIG. 3 is schematic illustration of components that can be part of the execution/retire logic of the computer processor of FIG. 1 according to an embodiment of the present disclosure.

FIG. 3 is a schematic diagram illustrating the architecture of an illustrative embodiment of the execution/retire logic 109 of the CPU/Core 102 of FIG. 1 according to the present disclosure, including a number of functional units 201. The execution/retire logic 109 also includes a set of operand storage elements 203 that are operably coupled to the functional units 201 of the execution/retire logic 109 and configured to store transient operands that are produced and referenced by the functional units of the execution/retire logic 109. An interconnect network 205 provides a physical data path from the operand storage elements 203 to the functional units that can possibly consume the operand stored in the operand storage elements. The interconnect network 205 can also provide the functionality of a bypass routing circuit (directly from a producer functional unit to a consumer function unit).

Figure 4:
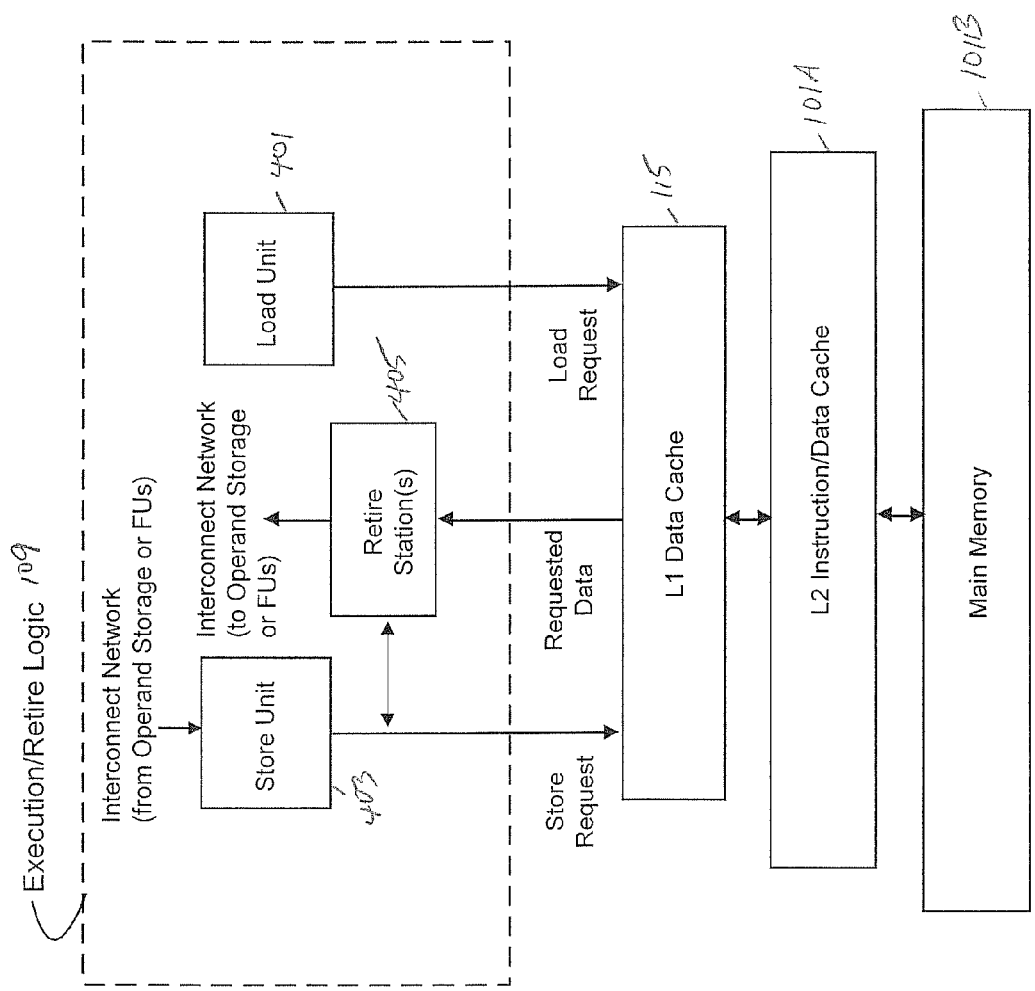
FIG. 4 is schematic illustration of components that can be part of the execution/retire logic and memory hierarchy of the computer processor of FIG. 1 according to an embodiment of the present disclosure.

In one embodiment shown in FIG. 4, the memory hierarchy of the CPU/Core 102 includes several levels of cache, such as L1 data cache 115 (for example, with an access time of three machine cycles) and an L2 instruction/data cache 101A (for example, with an access time of 10 machine cycles), as well as main memory 101B (for example, with an access time of 400 machine cycles). Other memory hierarchy organizations and access times can also be used. The functional units of the execution/retire logic 109 includes a load unit 401 and a store unit 403 as shown. DLOAD operations are decoded by the decode stage 107 and issued for execution by the load unit 401, which issues a load request corresponding to the decoded DLOAD operation to the L1 Data Cache 115. The address for the load request can be provided directly from the machine code of the DLOAD operation. Alternatively, the address for the load request can be provided from the operand storage (via the interconnect network 205) at a reference specified by the machine code of the DLOAD operation. STORE operations are decoded by the decode stage 107 and issued for execution by the store unit 403, which issues a store request corresponding to the decoded STORE operation to the L1 Data Cache 115. The address for the store request can be provided directly from the machine code of the STORE operation. Alternatively, the address for the store request can be provided from the operand storage (via the interconnect network 205) at a reference specified by the machine code of the STORE operation. The operand data for the store request can be provided from the operand storage (via the interconnect network 205) at a reference specified by the machine code of the STORE operation.

The likelihood and duration of load stalls can be reduced by scheduling the issuance of DLOAD operations as far in advance of need as possible. For example, if a given DLOAD operation is issued ten machine cycles early then there would be no stall even if the DLOAD operation missed in the L1 data cache 115, so long as it hit in the L2 Instruction/Data Cache 101A. However, if the ten cycle DLOAD operation does hit in the L1 data cache 115, then the value would be available seven machine cycles early and unnecessarily takes up space in the fast operand storage. Furthermore, such variability in the time of availability of the value can lead to issues in referencing the operand storage memory that is to hold the value for subsequent operations, particularly where temporal based addressing such as belt is used for the fast operation storage as described in U.S. patent application Ser. No. 14/312,159, filed on Jun. 23, 2014, herein incorporated by reference in its entirety. Consequently, any DLOAD operation whose result can be available early (in a machine cycle prior to a scheduled machine cycle for its availability) can employ buffering to hold such results until the scheduled machine cycle for its availability.

The execution/retire logic 109 supplies this buffering in the form of retire stations 405, which are hardware units that are able to hold the address of a DLOAD operation and possibly buffer the result data as it arrives from the memory hierarchy. The number of retire stations 405 can vary. Each retire station 405 is capable of handling one potential in-flight DLOAD operation. A DLOAD operation contains arguments that specify a memory address and possibly the width and scalarity of the desired data. Thus, a DLOAD operation may request to load a byte from address 0x123456789. The DLOAD operation is decoded and issued for execution by the load unit 401. When executing the DLOAD operation, the load unit 401 allocates a retire station 405 from the available pool of retire stations and configures the allocated retire station to set a status flag that indicates expiration of the schedule latency for the given DLOAD operation. The load unit also sends the station number of the allocated retire station with the address and width as part of a load request to the L1 Data Cache.

The L1 data cache 115 services the load request by returning all (or part) of the requested data that hits in the L1 data cache 115 to the allocated retire station 405. The station number of the allocated retire station can be associated with the returning requested data and can be used to route the returning requested data to the allocated retire station 405 that is allocated to handle the load request. If the requested data is not found (misses) in L1 data cache 115, the missing part(s) of the requested data are requested from the next level in the memory hierarchy (the L2 instruction/data cache 101A and so on) until it is located and copied back down the levels of the memory hierarchy to the L1 data cache 115, which returns the requested data to the allocated retire station 405. The allocated retire station 405 can buffer the requested data, if need be, until the status flag indicates that the schedule latency of the DLOAD operation has expired. At this point, the retire station 405 can output the stored requested data over the interconnect network 205 for storage in the fast operand storage 203 of the execution/retire logic 109, and then clears its state, and waits to be allocated again by another DLOAD operation.

The scheduling of the DLOAD operation can be configured such that the DLOAD operation is not issued any fixed number of machine cycles ahead of need. Instead, the DLOAD operation can be issued as early as possible (typically as soon as the address is known) and the need should be pushed to as late as possible so that the time between issue and use is as large as possible. If this schedule latency is bigger than needed and thus avoids a potential load stall with machine cycles to spare, then the data sits in the retire station buffer for the extra machine cycles. In the event that the schedule latency lead is less than needed and thus does not completely avoid the potential load stall, at least the duration of the load stall has been reduced by the duration of the schedule latency.

The instruction set architecture of the computer processor can permit each DLOAD operation to set its schedule latency (in machine cycles) as a manifest argument in its machine code. A scheduled latency of zero of course means that the data is needed at once because there's nothing else to do anyway, and this condition is common enough in programs, even after optimization, that the encoding supports it as a lower entropy special case in the encoding.

It is clearly desirable to have the scheduled latency of the DLOAD operation as big as possible. To achieve a larger scheduled latency, an optimizing compiler may hoist (move to earlier execution) a given DLOAD operation over other irrelevant code. For example, consider the source code:

$a=b*c;$ $x=*p+a;$ where p is a pointer whose value is to be loaded and incremented;

a, b and c are operands; and the multiply (b*c) is executed in four machine cycles.
The naive encoding for using temporal based addressing for the fast operand storage of the processor is:

```
MUL (b0, b1);              // where b0 is the reference to operand
                           // storage for a, and b1 is the reference to
                           // operand storage for b
NOP ( );                   //waiting for the multiply
NOP ( );
NOP ( );
DLOAD (0, <*p>);           // 0 is the number of machine cycles
                           // for the scheduled latency of the
                           // operation, and <*p> is the
                           // memory address of the pointer,
ADD (b0, b1); STORE (b0, <x>);   // <x> is the memory address of the
                                 // result
```

Note that the DLOAD operation has a zero scheduled latency, so there will be several stall machine cycles between the time the results of the DLOAD operation are available and the ADD operation.

The optimizing compiler can rewrite this as if the source code had been:

$t1=*p;$ $a=b*c;$ $x=t1+a;$ which will encode as:
DLOAD (3, <*p>); MUL (b0, b1);
NOP ( );
NOP ( );
NOP ( );
ADD (b0, b1); STORE (b0, <x>);

The DLOAD operation now has a scheduled latency of three machine cycles and will avoid a load stall if it hits in the LI Data Cache (and will lessen the stall if it does not).

The limit that the given DLOAD operation can be hoisted can be determined by the availability of the address and the possibility of read-after-write (commonly RAW) collision. Clearly a read cannot conclusively issue until the address to load from is known, although loads can be issued speculatively to a predicted address. However, for many DLOAD operations the address is known statically or far in advance and the limiting factor is collision. Consider the source code:

$y=a*b;$ $x=*p+y;$ where p is a pointer and x and y are in memory.

Whether the DLOAD operation (i.e., *p) can be hoisted over the store operation and thence over the multiply operation depends on whether the pointer p points to y. If it does not then the hoisting is permissible and the loaded value will be that of whatever p points to in memory. However, if p points to y then the DLOAD operation and the previous STORE operation collide and the DLOAD operation should return the result of the multiply. Thus, if the DLOAD operation is hoisted over the STORE operation, it will return the wrong result. Memory address collisions of this sort and several other sorts tend to sharply limit the ability of the optimizer to move code around for better performance, and in particular its ability to hoist loads.

The execution/retire logic 109 of the CPU/Core 102 can be configured to avoid such collisions by changing the ordering semantics of DLOAD operations and STORE operations. Traditionally every load operation observes and honors any store operation that precedes it in the instruction sequence, and need not observe any store operation that follows it. This rule assumes that any given load operation and store operation is atomic in time, so an ordering is unambiguous. However, the DLOAD operation as described herein introduces a specifiable scheduled latency, the DLOAD operation actually has two meaningful times: when it issues, and when it retires. For this case, the semantics of the DLOAD operation requires that the value loaded reflect the state of memory as of the retire time, not as of the issue time. Consequently, the DLOAD operations observes all STORE operations that execute before it retires, including those STORE operations that issue after it does.

Consequently, the collision example can be safely encoded as:

DLOAD (3, <*p>); MUL (b0, b1);
NOP ( );
NOP ( );
STORE (b0, <y>);
ADD (b0, b1); STORE (b0, <x>);

Clearly if p does not point at y then the hoist is safe. However, if p does point at y then the store operation to y (i.e., STORE (b0, <y>)) overrides the value loaded from the cache and is returned as the result of the load. The hoisted DLOAD operation and its cache access is thus wasted but harmless.

For this to work, the in-flight DLOAD operations must be made aware of (potentially) colliding STORE operations that take place between the issue cycle for the DLOAD operation and the retire cycle for the DLOAD operation. This can be implemented by configuring the retire stations 405 to collectively monitor (or snoop on) the address and data signals (e.g., address and data bus signals) used to communicate the store requests to the L1 data cache 115. Each active retire station 405 can be configured to compare the address argument of the store request to the address of its own in-flight DLOAD operation. If there is a (partial or complete) match, the data being stored is copied into the buffer of the retire station and marked as having come from an intervening STORE operation. Thereafter any data returned from a previously issued load request that arrives from the L1 data cache 115 will be discarded rather than buffered in the retire station 405. Two or more colliding stores each replace the data from the previous STORE operation so the buffer of the retire station always reflects the most recent collision. The data buffered by the retire station 405 is output over the interconnect network 205 to the fast operand storage 203 of the execution/retire logic 109 at the expiration of the scheduled latency as described above.

Note that the DLOAD operations and STORE operations can collide only in part, if the addressed memory of each only partly overlaps. Consequently, the collision logic of the retire station must be present for each byte in the buffer of the retire station. Thus, the final retire value output to the fast operand storage of the processor at the expiration of the scheduled latency may be an amalgam of bytes from the issued DLOAD operation and one or more colliding STORE operations. However, it will always reflect the state of memory as it is at retire time.

Figure 5A:
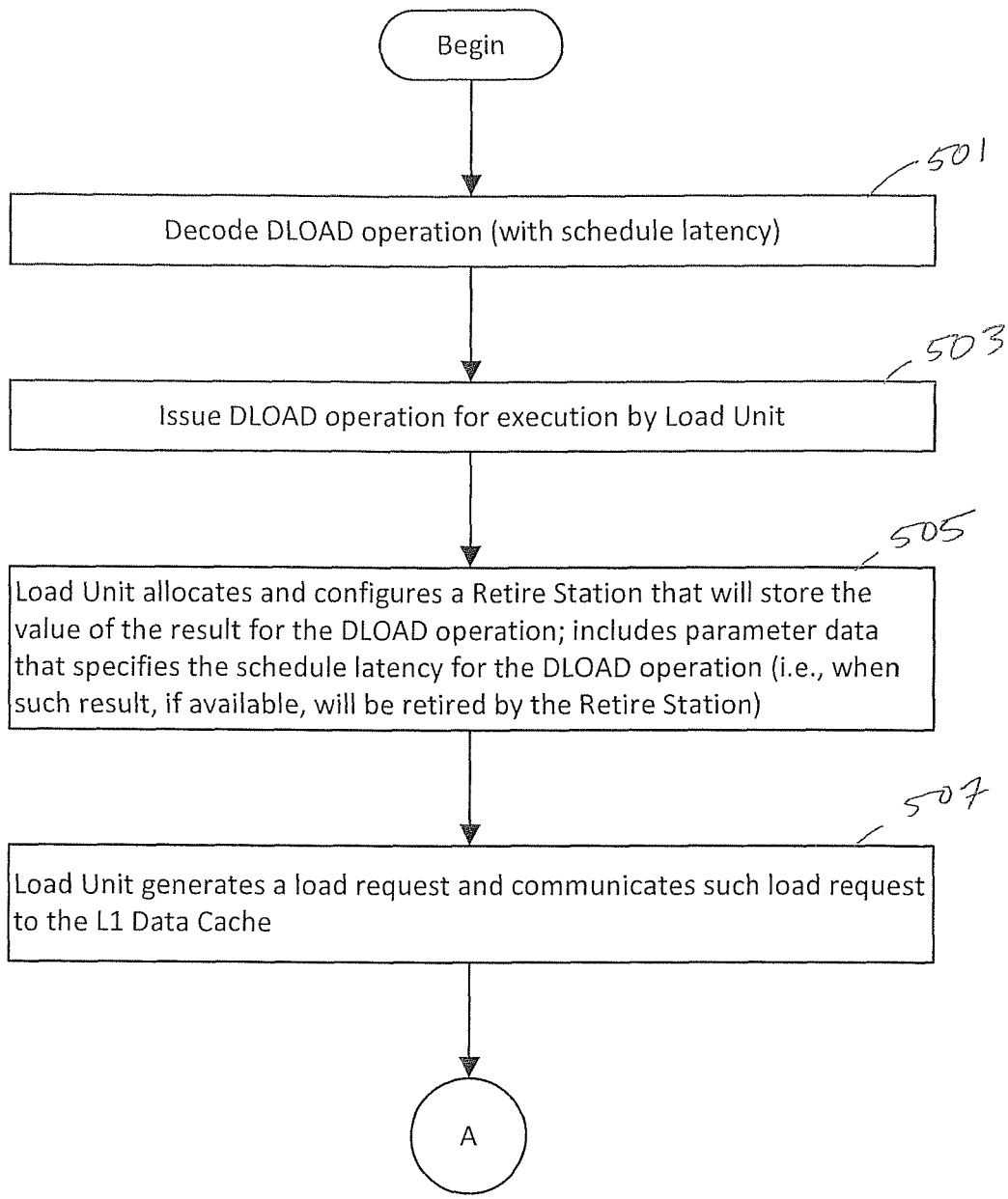
FIGS. 5A-5C, collectively, is a flow chart that illustrates exemplary operations carried out by the computer processor of FIGS. 1 and 4 in processing a given DLOAD operation in accordance with the present disclosure.
Figure 5B:
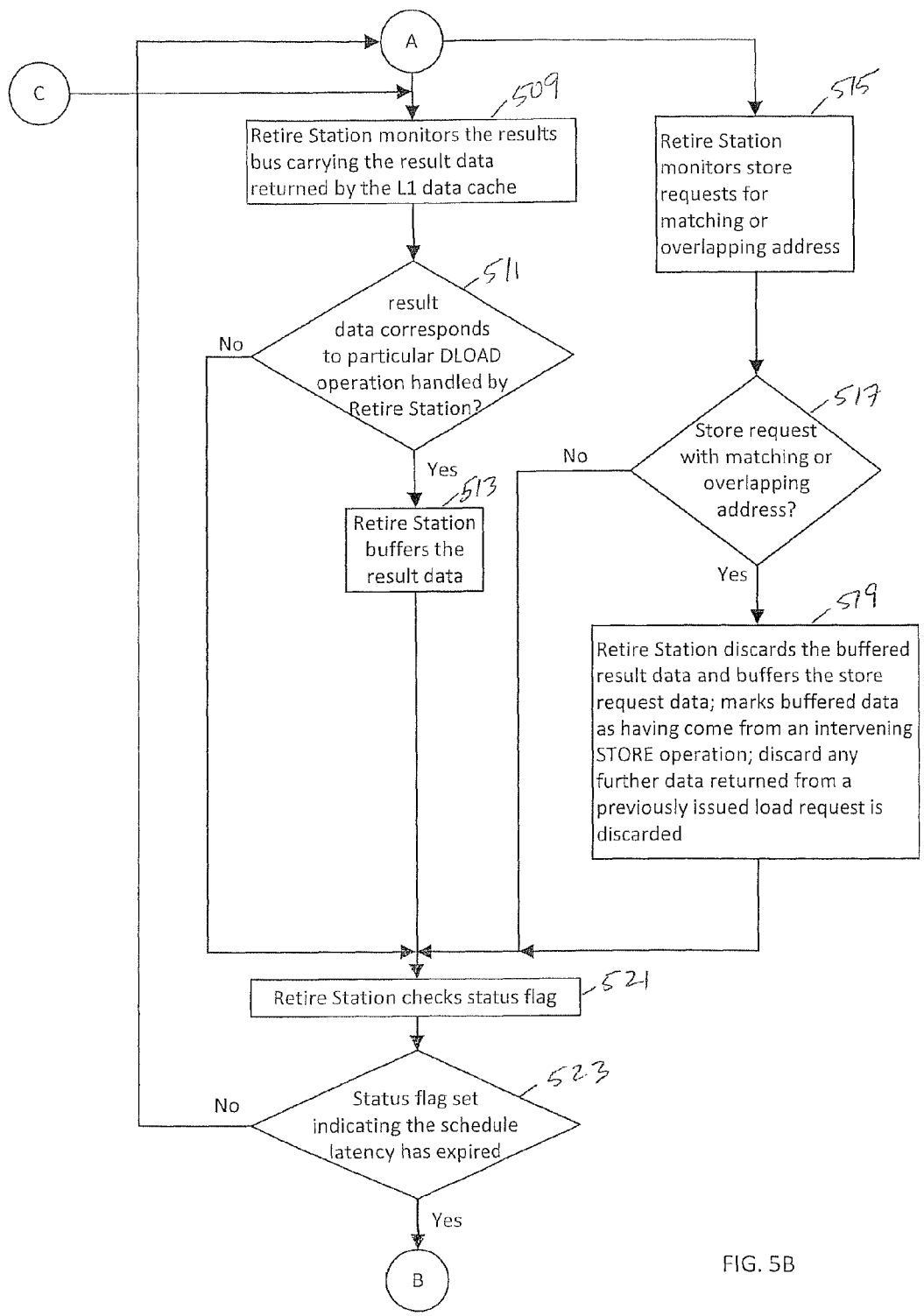
Figure 5C:
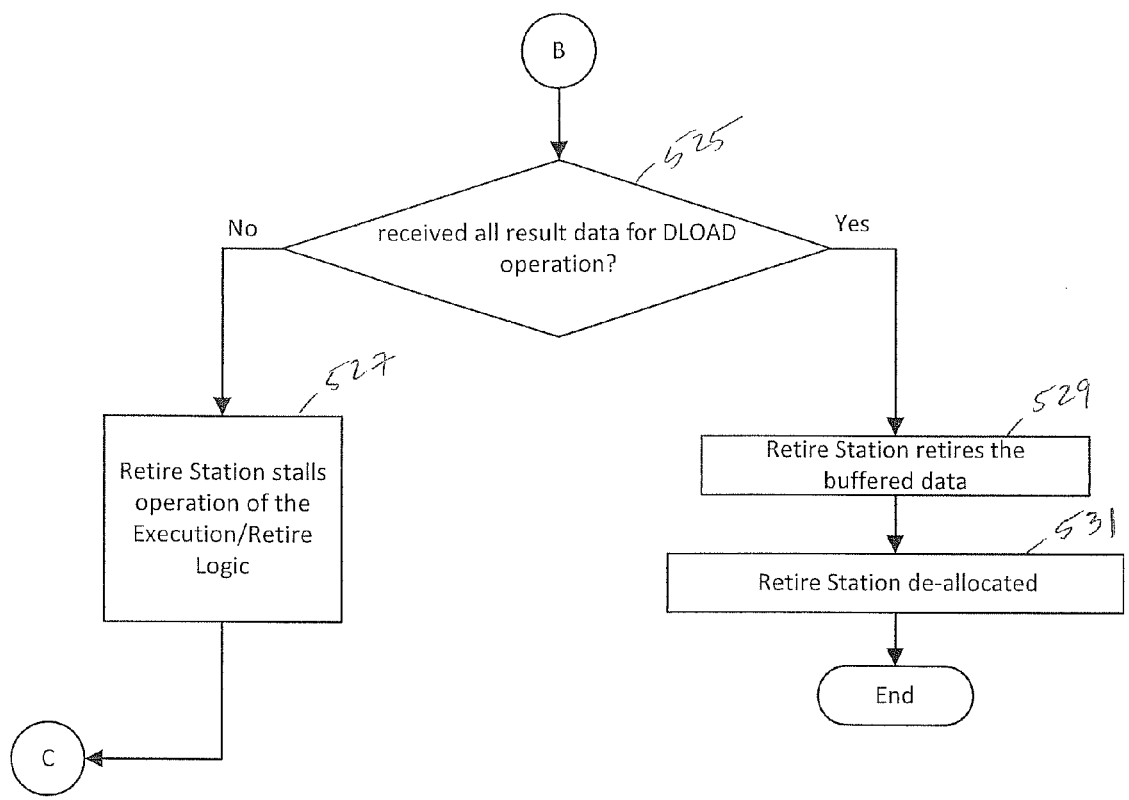

FIG. 5A-5C, collectively, is a flow chart that illustrates exemplary operations carried out by the computer processor of FIGS. 1 and 4 in processing a given DLOAD operation in accordance with the present disclosure. In block 501, the operations being where the given DLOAD operation is decoded by the decode stage 107 of the CPU/Core 102. In block 503, the given DLOAD operation is issued for execution by the load unit 401.

In block 505, the load unit 401 begins execution of the given DLOAD operation by allocating a retire station from the available pool of retire stations and configuring the allocated retire station to set a status flag that indicates expiration of the schedule latency for the given DLOAD operation. Such configuration can involve the load unit 401 loading parameter data into the allocated retire station where such parameter data specifies the schedule latency for the given DLOAD operation.

In block 507, the load unit 401 generates a load request and communicates such load request to the L1 data cache 115. The load request includes the station number of the allocated retire station along with the address and width of the requested data.

The operations then continue to carry out two processing paths (blocks 509/511/513 and blocks 515/517/519) in parallel with one another.

In block 509, the retire station monitors the results bus carrying the result data returned by the L1 data cache 115. The station number of the allocated retire station can be associated with the returning requested data and can be used to route the returning requested data to the allocated retire station 405 that is allocated to handle the load request.

In block 511, the retire station determines whether the result data returned by the L1 data cache 115 as dictated by the monitoring of block 509 corresponds to the in-flight load request for the given DLOAD operation handled by the retire station. If so, the operations continue to block 513 where the retire station buffers such result data returned by the L1 data cache 115. Otherwise, the operations continue to block 521 as described below.

In block 515, the retire station monitors (or snoops on) the address and data signals (e.g., address and data bus signals) used to communicate the store requests from the store unit 403 to the L1 data cache 115. In this block 515, the retire station can be configured to compare the address argument of the store request to the address of the in-flight DLOAD operation that it is handling.

In block 517, the retire station determines whether there is a store request with a matching or overlapping address as dictated by the monitoring of block 515. If so, the operations continue to block 519 where the retire station discards any buffered result data and buffers the store request data. Furthermore, the retire station marks buffered data as having come from an intervening STORE operation and is configured to discard any further data returned from a previously issued load request. The operations then continue to block 521. If in block 517, the retire station determines that there is no store request with a matching or overlapping address as dictated by the monitoring of block 515, the operations bypass block 519 and continue to block 512.

In block 521, the retire station checks the status flag that indicates that the schedule latency has expired.

In block 523, the retire station determines whether the status flag checked in block 521 is set and thereby indicates that the schedule latency has expired. If not, the operations return back to the two parallel processing paths of blocks 509/511/513 and blocks 515/517/519 as described above. This path corresponds to the case where the schedule latency of the given DLOAD operation has not yet expired (irrespective of the execution latency of the given DLOAD operation. If in block 523 the retire station determines that the status flag checked in block 521 is set and thereby indicates that the schedule latency has expired, the operations continue to block 525.

In block 525, the retire station determines whether all result data for the DLOAD operation has been received and thereby indicates that the execution latency has expired. If not, the operations continues to block 527 where the retire station stalls the operation of the execution/retire logic 109 of the CPU/Core 102. This path corresponds to the case where the schedule latency of the given DLOAD operation has expired but the execution latency of the given DLOAD operation has not yet expired. The operations then continue to the path of blocks 509 to 513. In this case, the stall operations of the CPU/Core 102 can continue until the all result data for the given DLOAD operation has been returned from the L1 data cache 115. In one embodiment, in the event that the machine stalls waiting for the expiration of the execution latency, both the issuance and retire stages of execution can stall with only truly asynchronous activity, such as in-flight loads and stores, continuing.

If in block 525 the retire station determines that all result data for the given DLOAD operation has been received and thereby indicates that the execution latency has expired, the operations continue to block 529. This path corresponds to the case where both the schedule latency of the given DLOAD operation and the execution latency of the given DLOAD operation has expired.

In block 529, the retire station retires the buffer data by outputting the stored data over the interconnect network 205 for storage in the fast operand storage 203 of the execution/retire logic 109. Note that the final retire value output to the fast operand storage of the execution/retire logic 109 at the expiration of the scheduled latency may be an amalgam of bytes from the issued DLOAD operation and one or more colliding STORE operations. However, it will always reflect the state of memory as it is at retire time.

The operations continue to block 531 where the retire station is de-allocated and clears its state and waits to be allocated again by another DLOAD operation.

Figure 6:
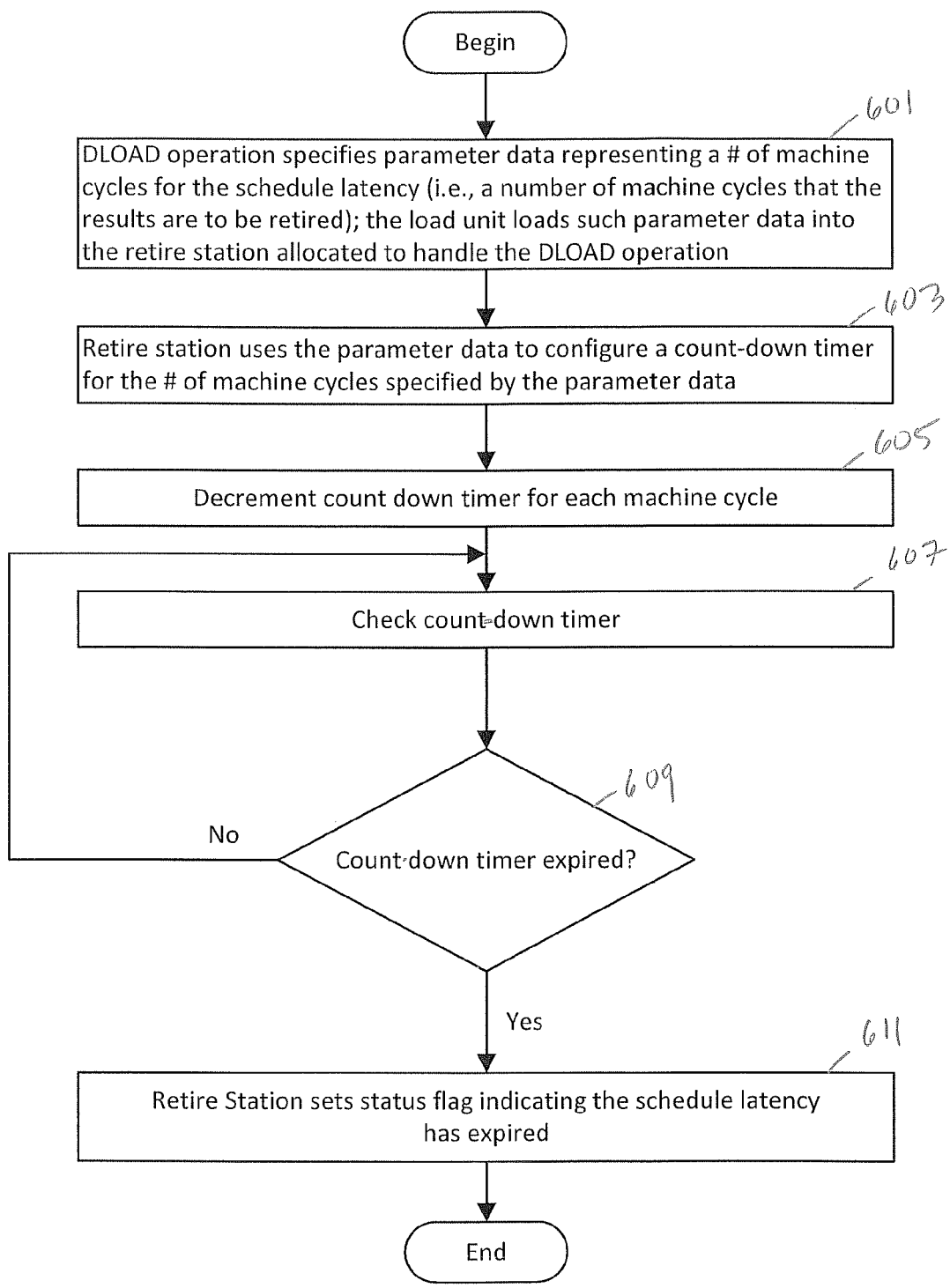
FIG. 6 is a flow chart that illustrates exemplary operations carried out by the load unit and retire station of the computer processor of FIGS. 1 and 4 in processing a given DLOAD operation with a schedule latency specified by a machine cycle count included in the machine code of the DLOAD operation.

FIG. 6 is a flow chart that illustrates exemplary operations carried out by the load unit and retire station of the computer processor of FIGS. 1 and 4 in processing a given DLOAD operation with a schedule latency specified by a machine cycle count included in the machine code of the DLOAD operation. In block 601, the load unit 401 loads parameter data that specifies this machine cycle count into the retire station allocated to handle the given DLOAD operation.

In block 603, the retire station uses the parameter data to configure a count-down timer for the number of machine cycles specified by the parameter data.

In block 605, the count-down timer is decremented for each machine cycle.

In block 607, the retire station checks the current value of the count-down timer.

In block 609, the retire station determines whether the value of the count-down checked in block 607 is zero and thus indicates that the count-down timer has expired. If not, the operations returns to block 607 in order to wait until the count-down timer has expired. If so, the operations continues to block 611 where the retire station sets a status flag to indicate the schedule latency has expired.

Figure 7:
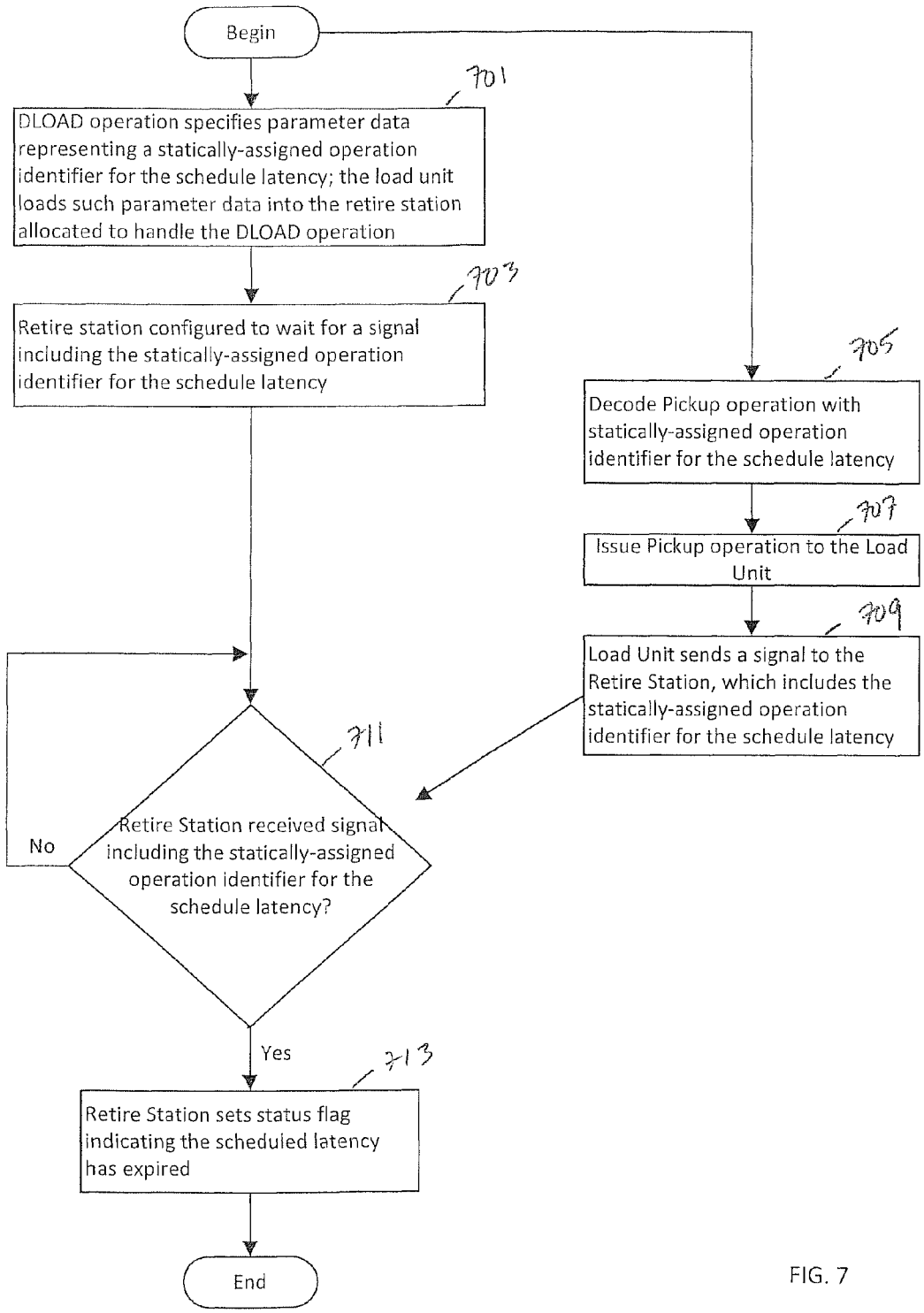
FIG. 7 is a flow chart that illustrates exemplary operations carried out by the load unit and retire station of the computer processor of FIGS. 1 and 4 in processing a given DLOAD operation with a schedule latency specified by a statically-assigned operation identifier included in the machine code of the given DLOAD operation.

FIG. 7 is a flow chart that illustrates exemplary operations carried out by the load unit and retire station of the computer processor of FIGS. 1 and 4 in processing a given DLOAD operation with a schedule latency specified by a statically-assigned operation identifier included in the machine code of the given DLOAD operation.

In block 701, the load unit 401 loads parameter data that specifies this a statically-assigned operation identifier into the retire station allocated to handle the given DLOAD operation.

In block 703, the retire station allocated to handle the given DLOAD operation is configured to wait for a signal including the statically-assigned operation identifier for the schedule latency.

In block 705, the decode stage of the CPU/Core 102 decodes a PICKUP operation whose machine code includes the same statically-assigned operation identifier for the schedule latency of the given DLOAD operation, which is issued to the load unit 401 in block 707.

In block 709, the load unit 401 executes the PICKUP operation, which involves sending a signal to the active retire stations where such signal includes the statically-assigned operation identifier for the schedule latency of the given DLOAD operation.

In block 711, the retire station allocated to handle the given DLOAD operation waits to receive the signal that includes the statically-assigned operation identifier for the schedule latency of the given DLOAD operation as communicated from the load unit 401. When the signal is received, the operations continue to block 713 where the retire station sets a status flag to indicate the schedule latency has expired.

The semantics of the DLOAD operation can also be defined for CALL operations and interrupts and traps. The CALL operation is an operation (or sequence of operations) within an instruction sequence (referred to as the Caller) that directs execution to a specified subroutine or function frame activation (referred to as the Callee). The function frame activation is an active instance of a subroutine or function which has not yet terminated with a RETURN operation. The RETURN operation within the Callee directs execution back to the Caller. Nested CALL and RETURN operations can be used to encapsulate one function frame activation within another. The semantics of the CALL operation can be embodied in a single operation or possibly be broken up into a stereotyped sequence of operations. Both cases are referred to as a CALL operation herein. Similarly, the semantics of the RETURN operation can be embodied in a single operation or possibly be broken up into a stereotyped sequence of operations. Both cases are referred to as a RETURN operation herein.

Note the processing of the CALL and RETURN operations can occur in a nested manner when the program code includes nested CALL operations. Furthermore, the same processing of the CALL operation is carried out in the event that an interrupt or trap occurs, which can be treated as an involuntary CALL operation. After the interrupt or trap has been handled, the operations perform a RETURN operation that restores the processor context.

Specifically, the semantics of the DLOAD operation can be defined to address the scenario where a CALL operation occurs within the schedule latency of a DLOAD operation. The schedule latency may be defined to include the period executed within a function frame activation, or to exclude it.

In one embodiment, the period executed within the function frame activation (or possibly within nested function frame activations) can be excluded from the schedule latency. In this case, the processing of any cycle-count type of DLOAD operation (e.g., FIG. 6) of the Caller is configured such that the count-down timer for the DLOAD operation of the Caller does not count down during the period executed within a function frame activation. Furthermore, the processing of any pickup-type of DLOAD operation (e.g., FIG. 7) of the Caller is configured such the PICKUP operation (and possibly a corresponding "refuse" operation) for the pickup-type DLOAD operation of the Caller is ignored. Note that the namespace of the statically-assigned operation identifiers for the pickup-type DLOAD operations and PICKUP operations and "refuse" operations can be defined as global to the machine, or local to a thread, process, or function frame.

In another embodiment, the period executed within the function frame activation (or possibly within nested function frame activations) can be included in the schedule latency. In this case, the processing of any cycle-count type of DLOAD operation (e.g., FIG. 6) of the Caller is configured such that the count-down timer for the DLOAD operation of the Caller continues to count down during the period executed within a function frame activation. Furthermore, the processing of any pickup-type of DLOAD operation (e.g., FIG. 7) of the Caller is configured such the PICKUP operation (and possibly a corresponding "refuse" operation) for the pickup-type DLOAD operation of the Caller is honored. In this case, it is possible for a cycle-counted type of DLOAD operation that was issued in a Caller to retire in the Callee. It also becomes possible for a pickup deferred operation issued in the caller to be picked up (or refused) in the Callee (in this case, the Caller and Callee must share a deferred operation identifier namespace). It is also possible to define cycle-counted type DLOAD operations as inclusive (where the period executed within the function frame activation is included in the schedule latency) while pickup-type DLOAD operations are exclusive (where the period executed within the function frame activation is excluded from the schedule latency), and vice versa.

Because the occurrence of an interrupt or trap is generally unpredictable by the program, inclusive deferral (where the period executed within the function frame activation is included in the schedule latency) can be impractical by design. That is, deferrals must generally be saved and restored over such events. However, it is possible for the machine to use exclusive deferrals (where the period executed within the function frame activation is excluded from the schedule latency) for interrupts and traps while using inclusive deferrals where the period executed within the function frame activation is included in the schedule latency) for explicit CALL operations.

The semantics of the DLOAD operation can also be defined to address the scenario where a DLOAD operation issued as part of a function frame activation is inflight at the time the RETURN operation is executed.

In one embodiment, the inflight DLOAD operation issued in the function frame activation can retire in the Caller after the intervening RETURN operation.

In another embodiment, the RETURN operation can be treated as an implicit refuse of the inflight DLOAD operation such that the inflight DLOAD operation is discarded.

In the case of exclusive deferral of DLOAD operations (where the period executed within the function frame activation is excluded from the schedule latency), the execution/retire logic 100 can be configured to save the state of pending inflight DLOAD operations over the intervening CALL operation. However, the CALL operation itself may issue its own deferred operations, and its calls recursively. Consequently the number of potentially outstanding in-flight deferred DLOAD operations is unbounded. However, the number of potentially outstanding deferred DLOAD operations in any one function frame activation is bounded, by the size of the identifier namespace for pickup-type DLOAD operations, and by the maximum expressible cycle count in cycle-counted type DLOAD operations. Consequently a natural implementation of exclusive deferred operation semantics is for the CALL operation (or sequence) to save the state of pending in-flight DLOAD operation in the stack frame as is done with other per-function processor state information, and for the return operation (or sequence) to restore it. The execution logic 109 of the CPU/Core 102 can employ dedicated memory to store a copy of such processor state information as needed. The dedicated memory can be part of a memory circuit internal to the CPU/Core 102, such as scratchpad memory as described in U.S. patent application Ser. No. 14/311,988, filed on Jun. 23, 2014, herein incorporated by reference in its entirety. The dedicated memory can also be part of the memory hierarchy (cache memory/main memory) of the CPU/Core 102 or other suitable memory circuit. The save and restore logic can be realized by a hardware engine (spiller unit) that is configured to save and restore processor context across subroutine or functional calls as described in U.S. patent application Ser. No. 14/311,988. The save and restore logic that saves and restores the processor state information can operate according to a "reissue model" where any pending inflight DLOAD operation is aborted and the results (if any) are discarded, and only the DLOAD operation and its arguments are saved. At the restore time triggered by the RETURN operation, the DLOAD operation is then reissued either immediately or in any case no later than the retire step, and the new results are retired. In the case of inclusive deferral of DLOAD operations (where the period executed within the function frame activation is included in the schedule latency), the save and restore logic can operate according to a "completion model" where any pending in-flight DLOAD operation is permitted to complete execution and the result is saved and later restored at the retire step. Of these two models, the completion model is more natural when the ordering is by issue step, while the reissue model is more natural when ordering is by retire step. However, it will be evident that these are independent design choices, and indeed a hybrid approach in which completions are saved if available and buffer capacity for them exists, and while operations are saved and reissued otherwise.

There have been described and illustrated herein several embodiments of a computer processor and corresponding method of operations. While particular embodiments of the invention have been described, it is not intended that the invention be limited thereto, as it is intended that the invention be as broad in scope as the art will allow and that the specification be read likewise. For example, the microarchitecture and memory organization of the CPU 101 as described herein is for illustrative purposes only. A wide variety of CPU microarchitectures can embody the improvement and methods described herein, including microarchitectures that employ in-order execution, microarchitectures that employ out-of-order execution, superscalar microarchitectures, VLIW microarchitectures, single-core microarchitectures, multi-core microarchitectures, and combinations thereof. In another example, the functionality of the CPU 101 as described herein can be embodied as a processor core and multiple instances of the processor core can be fabricated as part of a single integrated circuit (possibly along with other structures). It will therefore be appreciated by those skilled in the art that yet other modifications could be made to the provided invention without deviating from its spirit and scope as claimed.

What is claimed is:

1. A computer processor comprising:
   execution logic including at least one functional unit and operand storage that stores data that is produced and consumed by the at least one functional unit;
   wherein the at least one functional unit is configured to execute a deferred operation whose execution produces result data; and
   wherein the execution logic further includes a retire station that is configured to store and retire the result data of the deferred operation in order to store such result data in the operand storage, wherein the retire of such result data occurs at a machine cycle following issue of the deferred operation as controlled by statically-assigned parameter data included in the encoding of the deferred operation.

2. The computer processor according to claim 1, wherein:
   the statically-assigned parameter data defines schedule latency for the deferred operation and the execution of the deferred operation defines an execution latency.

3. The computer processor according to claim 2, wherein:
   in the event that the execution latency expires before the schedule latency, the retire station is configured to buffer the result data for at least one machine cycle following the expiration of the execution latency.

4. The computer processor according to claim 2, wherein:
   in the event that the schedule latency expires before the execution latency, the retire station is configured to control the execution logic to stall for at least one machine cycle following the expiration of the schedule latency.

5. The computer processor according to claim 2, wherein:
   in the event that a call operation occurs within the schedule latency of the deferred operation, the schedule latency is defined to include a time period executed within the callee of the call operation.

6. The computer processor according to claim 2, wherein:
   in the event that a call operation occurs within the schedule latency of the deferred operation, the schedule latency is defined to exclude a time period executed within the callee of the call operation.

7. The computer processor according to claim 6, wherein:
   the execution logic is configured to discard any result data stored by the retire station in conjunction with processing the call operation.

8. The computer processor according to claim 6, wherein:
   the execution logic further includes logic that saves data pertaining to the deferred operation and uses the saved data to reissue the deferred operation in response to returning from the callee of the call operation.

9. The computer processor according to claim 1, wherein:
   the statically-assigned parameter data represents a number of machine cycles between issue of the deferred operation and retiring the result data produced by execution of the deferred operation under the assumption that such result data is available at the time of retiring.

10. The computer processor according to claim 9, wherein:
    the statically-assigned parameter data is used to configure a count-down timer whose output is used to dictate the machine cycle in which the result data produced by execution of the deferred operation is retired.

11. The computer processor according to claim 1, wherein:
    the statically-assigned parameter data represents an operational identifier that is used by a corresponding pickup operation whose execution dictates the machine cycle in which the result data produced by execution of the deferred operation is retired.

12. The computer processor according to claim 1, wherein:
    the deferred operation comprises a deferred load operation that is executed by a load unit.

13. The computer processor according to claim 12, wherein:
    a retire station is allocated from a pool of retire stations such that the allocated retire station stores result data produced by the execution of the deferred load operation.

14. The computer processor according to claim 12, wherein:
    the execution of the deferred load operation by the load unit involves generating a load request for communication to a hierarchical memory system.

15. The computer processor according to claim 14, wherein:
    the retire station is configured to monitor intervening store requests communicated to the hierarchical memory system in order to determine if the address data of such intervening store requests overlap with the address of the deferred load operation handled by the retire station, and if so stores the data of the store request for retirement to the operand storage of the execution logic.

16. A method of operating a computer processor comprising:
    configuring at least one functional unit to execute a deferred operation whose execution produces result data; and
    configuring a retire station to store and retire the result data of the deferred operation in order to store such result data in operand storage of the computer processor, wherein the retire of such result data occurs at a machine cycle following issue of the deferred operation as controlled by statically-assigned parameter data included in the encoding of the deferred operation.

17. The method according to claim 16, wherein:
    the statically-assigned parameter data defines schedule latency for the deferred operation and the execution of the deferred operation defines an execution latency.

18. The method according to claim 17, further comprising:
    in the event that the execution latency expires before the schedule latency, configuring the retire station to buffer the result data for at least one machine cycle following the expiration of the execution latency.

19. The method according to claim 17, further comprising:
    in the event that the schedule latency expires before the execution latency, configuring the retire station to control the execution logic to stall for at least one machine cycle following the expiration of the schedule latency.

20. The method according to claim 16, wherein:
    the statically-assigned parameter data represents a number of machine cycles between issue of the deferred operation and retiring the result data produced by execution of the deferred operation under the assumption that such result data is available at the time of retiring.

21. The method according to claim 20, further comprising:
using the statically-assigned parameter data to configure a count-down timer whose output is used to dictate the machine cycle in which the result data produced by execution of the deferred operation is retired.

22. The method according to claim 16, wherein:
the statically-assigned parameter data represents an operational identifier that is used by a corresponding pickup operation whose execution dictates the machine cycle in which the result data produced by execution of the deferred operation is retired.

23. A computer processor comprising:
execution logic and at least one cache memory integrated as part of an integrated circuit;
wherein the execution logic includes at least one functional unit and operand storage that stores data that is produced and consumed by the at least one functional unit, wherein the at least one functional unit includes a load unit configured to execute a deferred load operation whose execution communicates with the least one cache memory to retrieve result data therefrom, and the execution logic further includes a retire station that is configured to store and retire the result data of the deferred load operation in order to store such result data in the operand storage, wherein the retire of such result data occurs at a machine cycle following issue of the deferred load operation as controlled by statically-assigned parameter data included in the encoding of the deferred load operation.

* * * * *

UNITED STATES PATENT AND TRADEMARK OFFICE
CERTIFICATE OF CORRECTION

PATENT NO. : 9,690,581 B2
APPLICATION NO. : 14/515033
DATED : June 27, 2017
INVENTOR(S) : Roger Rawson Godard et al.

Page 1 of 1

It is certified that error appears in the above-identified patent and that said Letters Patent is hereby corrected as shown below:

On the Title Page

Item (73) Assignee: change "Mil Computing, Inc." to --Mill Computing, Inc.--

Signed and Sealed this
Fourteenth Day of May, 2019

Andrei Iancu
*Director of the United States Patent and Trademark Office*